US008264939B2

(12) United States Patent
Hotta et al.

(10) Patent No.: US 8,264,939 B2
(45) Date of Patent: Sep. 11, 2012

(54) OPTICAL PICKUP APPARATUS

(75) Inventors: Tohru Hotta, Okaya (JP); Ryoichi Kawasaki, Isesaki (JP)

(73) Assignees: Sanyo Electric Co., Ltd., Osaka (JP); Sanyo Optec Design Co., Ltd., Tokyo (JP)

( * ) Notice: Subject to any disclaimer, the term of this patent is extended or adjusted under 35 U.S.C. 154(b) by 0 days.

(21) Appl. No.: 12/945,636

(22) Filed: Nov. 12, 2010

(65) Prior Publication Data

US 2011/0116354 A1 May 19, 2011

(30) Foreign Application Priority Data

Nov. 16, 2009 (JP) ................................ 2009-260601

(51) Int. Cl.
*G11B 7/00* (2006.01)

(52) U.S. Cl. .................................................. 369/112.23

(58) Field of Classification Search ............. 369/112.23, 369/112.08, 112.13, 44.23, 94, 112.25, 112.26; 359/719, 721–724

See application file for complete search history.

(56) References Cited

U.S. PATENT DOCUMENTS

| | | | | |
|---|---|---|---|---|
| 5,790,506 | A * | 8/1998 | Morita et al. | 369/94 |
| 2003/0103271 | A1 * | 6/2003 | Ohta | 359/719 |
| 2004/0218503 | A1 * | 11/2004 | Ikenaka | 369/112.07 |
| 2004/0264354 | A1 * | 12/2004 | Hirayama | 369/112.23 |
| 2005/0007934 | A1 * | 1/2005 | Ohta et al. | 369/112.23 |
| 2006/0018237 | A1 * | 1/2006 | Sugi et al. | 369/44.23 |
| 2006/0215280 | A1 * | 9/2006 | Hayashi et al. | 359/738 |
| 2008/0180815 | A1 * | 7/2008 | Yamagata et al. | 359/719 |
| 2008/0212452 | A1 * | 9/2008 | Hotta et al. | 369/112.23 |
| 2009/0059769 | A1 * | 3/2009 | Taka | 369/112.23 |

FOREIGN PATENT DOCUMENTS

| | | |
|---|---|---|
| JP | 10-160906 | 6/1998 |
| JP | 2008-282507 | 11/2008 |

* cited by examiner

*Primary Examiner* — Thang Tran
(74) *Attorney, Agent, or Firm* — SoCal IP Law Group LLP; Steven C. Sereboff; John E. Gunther

(57) ABSTRACT

An optical pickup apparatus includes: a laser diode configured to emit a laser beam; and an objective lens configured to condense the laser beam into a laser spot through which a signal recorded on a signal recording layer of an optical disc is read out by the laser beam, the objective lens having formed thereon a lens surface with a second numerical aperture for acting as a lens, which is larger than a first numerical aperture for forming the laser spot.

4 Claims, 3 Drawing Sheets

OPTICAL PICKUP APPARATUS

CROSS-REFERENCE TO RELATED APPLICATION

This application claims the benefit of priority to Japanese Patent Application No. 2009-260601, filed Nov. 16, 2009, of which full contents are incorporated herein by reference.

BACKGROUND OF THE INVENTION

1. Field of the Invention

The present invention relates to an optical pickup apparatus that carries out actions of reading out a signal recorded on an optical disc and of recording a signal on the optical disc by a laser beam.

2. Description of the Related Art

An optical disc apparatus is in popular use, which is able to carry out a signal reproducing action and a signal recording action by causing a laser beam emitted from an optical pickup apparatus to enter onto a signal recording layer of an optical disc.

While an optical disc apparatus using an optical disc such as a CD and a DVD is now in wide use, an optical disc apparatus using an optical disc with an improved recording density, i.e., a Blu-ray standard optical disc has been produced on a commercial basis in recent years.

A laser beam of a short wavelength, for example a blue-violet light having a wavelength of 405 nm, is used as a laser beam for a reading out action of a signal recorded on the Blu-ray standard optical disc.

The thickness of a protective layer disposed on the upper surface of a signal recording layer of the Blu-ray standard optical disc is provided at 0.1 mm, and the numerical aperture of an objective lens used for an action of reading out a signal from the signal recording layer is provided at 0.85.

The numerical aperture of the objective lens used for an action of reading out a signal recorded on the Blu-ray standard optical disc is determined to be 0.85 as described above, which is relatively large. As a logical consequence, an incident angle of a laser beam against the objective lens becomes large. This large incident angle against the objective lens results in an increase in the quantity of reflection of the laser beam on the outer region of the objective lens, thus leading to a decrease in the quantity of transmitted light on the outer region.

A decrease in the quantity of transmitted light on the outer region of the objective lens leads to a drop in a signal-to-noise ratio in a signal readout action, which poses a problem that the signal readout action cannot be carried out accurately. As a method for solving such a problem there is provided a method of forming an anti-reflection coating on an incident surface of the objective lens (see Japanese Patent Application Laid-Open Publication Nos. 10-160906 and 2008-282507).

The optical pickup apparatus that carries out an action of reading out a signal recorded on the Blu-ray standard optical disc is configured to use a laser diode that emits a blue-violet laser beam having the wavelength of 405 nm and the objective lens having the numerical aperture of 0.85, as described above. When a laser beam transmittance is not high at a position at which the numerical aperture of the objective lens is 0.85, the rim intensity of a laser spot generated by a condensing action of the objective lens decreases.

A decrease in the rim intensity of the laser spot causes the spot diameter, i.e., spot size to increase, which poses a problem of a drop in resolution for recognizing pits formed on the optical disc.

To solve such problems, the anti-reflection coating is formed on the incident surface of the objective lens to suppress a decrease in the quantity of transmission of a laser beam on the outer region. The objective lens is designed so that the transmittance in a range of use of the objective lens, that is, the transmittance at the numerical aperture 0.85 determined in correspondence to the Blu-ray standard optical disc becomes the maximum, and that the range of use up to the numerical aperture 0.85 acts as a lens surface.

An objective lens or a lens holder, however, has a manufacturing tolerance. This manufacturing tolerance makes it difficult to maximize the transmittance at the numerical aperture of 0.85 and makes it impossible to manufacture the objective lens or lens holder so that the range up to the numerical aperture 0.85 acts as the lens surface. Hence a problem arises such that a laser spot applicable to the action of reading out a signal recorded on the optical disc cannot be generated.

SUMMARY OF THE INVENTION

An optical pickup apparatus according to an aspect of the present invention, comprises: a laser diode configured to emit a laser beam; and an objective lens configured to condense the laser beam into a laser spot through which a signal recorded on a signal recording layer of an optical disc is read out by the laser beam, the objective lens having formed thereon a lens surface with a second numerical aperture for acting as a lens, which is larger than a first numerical aperture for forming the laser spot.

Other features of the present invention will become apparent from descriptions of this specification and of the accompanying drawings.

BRIEF DESCRIPTION OF THE DRAWINGS

For more thorough understanding of the present invention and advantages thereof, the following description should be read in conjunction with the accompanying drawings, in which.

DETAILED DESCRIPTION OF THE INVENTION

At least the following details will become apparent from descriptions of this specification and of the accompanying drawings.

An optical pickup apparatus of this embodiment is configured in such a way that when the numerical aperture of an objective lens that condenses the laser beam onto a signal recording layer of an optical disc to generate a laser spot is N1, a lens surface is formed on the objective lens, the lens surface acting as a lens up to a range of a numerical aperture N2, which is larger than the numerical aperture N1.

The optical pickup apparatus of this embodiment is configured in such away that an anti-reflection coating is formed on an incident surface of the objective lens, which determines a laser beam transmittance up to the range of the numerical aperture N2.

Further, the optical pickup apparatus of this embodiment is configured in such a way that the anti-reflection coating is formed on the incident surface of the objective lens so that the transmittance becomes the maximum for the numerical aperture N2.

According to the optical pickup apparatus of this embodiment, the objective lens is configured to act as the lens surface up to a range of a numerical aperture larger than the numerical aperture of the objective lens that generates a laser spot necessary for the signal readout action through the condensing action. This allows generation of a laser spot applicable to the signal readout action even if the objective lens has a manufacturing tolerance.

According to the optical pickup apparatus of this embodiment, the anti-reflection coating is formed to extend up to a range of a numerical aperture larger than the numerical aperture of the objective lens that generates a laser spot necessary for the signal readout action through the condensing action. This allows generation of a laser spot applicable to the signal readout action even if the objective lens has a manufacturing tolerance.

Further, according to the optical pickup apparatus of this embodiment, the anti-reflection coating is formed so that a transmittance becomes the maximum in a range of a numerical aperture larger than the numerical aperture of the objective lens that generates a laser spot necessary for the signal readout action through the condensing action. This allows keeping high the transmittance at the numerical aperture of the objective lens that generates a laser spot necessary for the signal readout action, thus offering an advantage of generating a laser spot with high rim intensity.

On the objective lens that generates a laser spot by condensing the laser beam onto the signal recording layer formed on the optical disc, the numerical aperture of the lens surface that acts to condense the laser beam is made larger than a provided numerical aperture to keep the rim intensity of the laser spot high.

Figure 1:
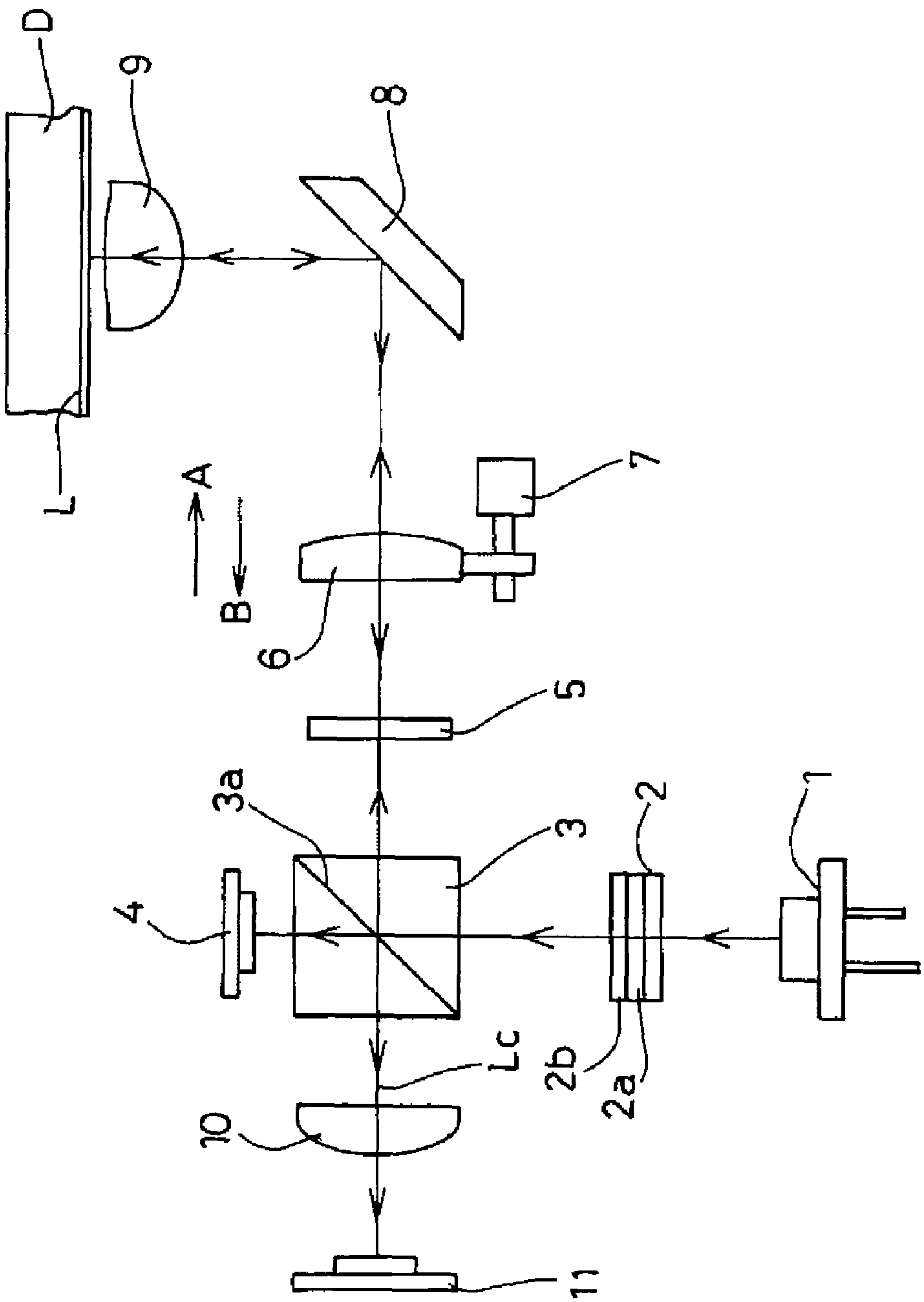
FIG. 1 is a schematic diagram of an optical pickup apparatus of this embodiment.

FIG. 1 is a schematic diagram of the optical pickup apparatus of this embodiment. The optical pickup apparatus of this embodiment will be described for a case of using it as an optical pickup apparatus that is configured to read out a signal recorded on a signal recording layer L of an optical disc D conforming to the Blu-ray standard.

In FIG. 1, 1 denotes a laser diode that emits a laser beam that is, for example, a blue-violet light 405 nm in wavelength, 2 denotes a diffraction grating which receives the incident laser beam emitted from the laser diode 1. This diffraction grating 2 is composed of a diffraction grating unit 2*a* that splits the laser beam into a main beam of zero-order light and two subbeams of +first-order light and −first-order light and a ½ wavelength plate 2*b* that converts the incident laser beam into linearly polarized light in an S-direction.

3 denotes a polarization beam splitter that receives an incident laser beam that has passed through the diffraction grating 2. This polarization beam splitter 3 has a control film 3*a* that reflects a large part of the S polarized laser beam while transmitting a P-direction polarized laser beam. 4 denotes a monitoring photodetector disposed at a location exposed to the laser beam having passed through the control film 3*a* of the polarization beam splitter 3 out of the laser beam emitted from the laser diode 1. Detection output from the photodetector 4 is used to control power output of the laser beam emitted from the laser diode 1.

5 denotes a ¼ wavelength plate disposed at a location exposed to an incident laser beam that has been reflected by the control film 3*a* of the polarization beam splitter 3. This ¼ wavelength plate 5 performs an action of converting the incident laser beam from a linearly polarized light into a circularly polarized light and, conversely, from a circularly polarized light into a linearly polarized light. 6 denotes a collimating lens on which the incident laser beam that has passed through the ¼ wavelength plate 5 enters to convert the incident laser beam into a parallel light. This collimating lens 6 is caused to shift in position in the optical axis direction, i.e., arrowed directions A and B, by an aberration correcting motor 7. A positional shifting action of the collimating lens 6 in the optical axis direction corrects spherical aberration that arises based on the thickness of a protective layer of the optical disc D.

8 denotes a rising mirror that is disposed at a location exposed to the incident laser beam that has passed through the collimating lens 6 and that reflects the incident laser beam toward the objective lens 9.

In such a configuration, the laser beam emitted from the laser diode 1 travels through the diffraction grating 2, the polarization beam splitter 3, the ¼ wavelength plate 5, the collimating lens 6, and the rising mirror 8 to enter onto the objective lens 9, and then by the condensing action of the objective lens 9 is applied onto the signal recording layer L of the optical disc D as a laser spot. The laser beam irradiated on the signal recording layer L is then reflected as a return light.

The return light reflected back from the signal recording layer L of the optical disc D travels through the objective lens 9, the rising mirror 8, the collimating lens 6, and the ¼ wavelength plate 5 to be incident on the control film 3*a* of the polarization beam splitter 3. The return light incident on the control film 3*a* of the polarization beam splitter 3 in this manner has been converted into a linearly polarized light in the P-direction through a phase altering action by the ¼ wavelength plate 5. Such return light, therefore, is not reflected by the control film 3*a* but passes through it as a control laser beam Lc.

10 denotes a sensor lens that receives the incident control laser beam Lc that has passed through the control film 3*a* of the polarization beam splitter 3. This sensor lens 10 performs actions of condensing and irradiating the control laser beam Lc onto a light-receiving unit disposed on a photodetector 11, which is called PDIC. The photodetector 11 has a known four-divided sensor and the like, and carries out a signal generating action accompanying an action of reading a signal recorded on the signal recording layer L of the optical disc D through an irradiating action of the main beam, a signal generating action for carrying out a focusing control action based on the astigmatism method, and a signal generating action for carrying out a tracking control action through irradiating actions of two subbeams.

The optical pickup apparatus of this embodiment is configured as described above, and in this configuration, the objective lens 9 is mounted on a member called a lens holder that is supported on a base of the optical pickup apparatus with four or six support wires to be able to make a positional shift in the direction perpendicular to the signal surface of the optical disc D, i.e., a focusing direction, and in the direction of a diameter of the optical disc D, i.e., a tracking direction.

The objective lens 9 is configured to be inserted in a circular mounting hole formed on the lens holder, in which state a collar formed on the objective lens 9 is fixed to a fixing portion formed on the peripheral edge of the mounting hole with an adhesive.

The optical pickup apparatus of this embodiment is configured as described above, and the actions of the optical pickup apparatus having the configuration as described above will next be described.

When an operation for carrying out the action of reading out a signal recorded on the signal recording layer L is carried out, a laser diode drive circuit (not depicted) supplies a drive signal for acquiring preset laser power output to the laser diode 1, and the laser diode 1 thus emits a laser beam of desired power output.

The laser beam emitted from the laser diode 1 is incident on the diffraction grating 2, and the diffraction grating unit 2*a* incorporated in the diffraction grating 2 splits the incident laser beam into the main beam and the subbeams and the ½ wavelength plate 2*b* converts the incident light into linearly polarized light in the S-direction. Laser beam having passed through the diffraction grating 2 is then incident on the polarization beam splitter 3, and the control film 3*a* incorporated in the polarization beam splitter 3 reflects a large part of the laser beam while transmitting part of the laser beam.

The laser beam that has passed through the control film 3*a* is emitted onto the monitoring photodetector 4, so that the monitoring photodetector 4 outputs a monitor signal corresponding in energy level to the incident laser beam. Hence, the energy level of the drive signal supplied to the laser diode 1 is controlled using such a monitor signal, thereby being able to control power output of the laser beam emitted from the laser diode 1 to a desired level of power output. Such an action is called an automatic output control action for laser.

The laser beam reflected by the control film 3*a* incorporated in the polarization beam splitter 3 is incident on the ¼ wavelength plate 5, and the laser beam is converted from a linearly polarized light into a circularly polarized light and then is emitted onto the collimating lens 6. The laser beam incident on the collimating lens 6 is then converted into parallel light, and then enters the rising mirror 8.

The laser beam incident on the rising mirror 8 is reflected by the rising mirror 8, and enters onto the objective lens 9. In this manner, the laser beam having traveled through the above described optical path is incident on the objective lens 9, and the objective lens 9 carries out a condensing action. The condensing action by the objective lens 9 generates a laser spot on the signal recording layer L of the optical disc D. At the same time, however, the signal recording layer L reflects the laser beam as a return light.

Such return light reflected by the signal recording layer L falls from the side of the optical disc D onto the objective lens 9. This return light incident on the objective lens 9 then travels through the rising mirror 8, the collimating lens 6, and the ¼ wavelength plate 5 to fall onto the control film 3*a* incorporated in the polarization beam splitter 3. Since the return light incident on the control film 3*a* has been converted into a linearly polarized light in the P-direction by the ¼ wavelength plate 5, the return light is not reflected by the control film 3*a* but entirely passes through the control film 3*a* as a control laser beam Lc.

The control laser beam Lc, which is the return light that has passed through the control film 3*a*, is incident on the sensor lens 10, and the sensor lens 10 adds astigmatism to control laser beam Lc and emits it onto the light-receiving unit disposed on the photodetector 11. As a result of emission of such control laser beam Lc onto the photodetector 11, a detection signal based on a shift in the position or shape of an exposure spot formed by the main beam or subbeams can be extracted from the four-divided sensor, etc., incorporated in the light-receiving unit of the photodetector 11.

A focus error signal and a tracking error signal are generated from such a detection signal, through which the objective lens 9 is controlled in its positional shift actions in the focus direction and in the tracking direction to be able to carry out the focusing control action for generating a laser spot of a desired shape on the signal recording layer L and the tracking control action for causing a laser spot to follow signal tracks formed on the signal recording layer L.

Through the focusing control action and the tracking control action of the optical pickup apparatus, the optical pickup apparatus is able to read out a signal recorded on the signal recording layer L of the optical disc D. A reproduced signal acquired by such a readout action can be acquired as information data by demodulating an RF signal generated from the photodetector 11 through a known method.

The optical pickup apparatus of the present invention has the configuration as described above. The summary of this embodiment will next be described referring to FIGS. 2 and 3.

Figure 2:
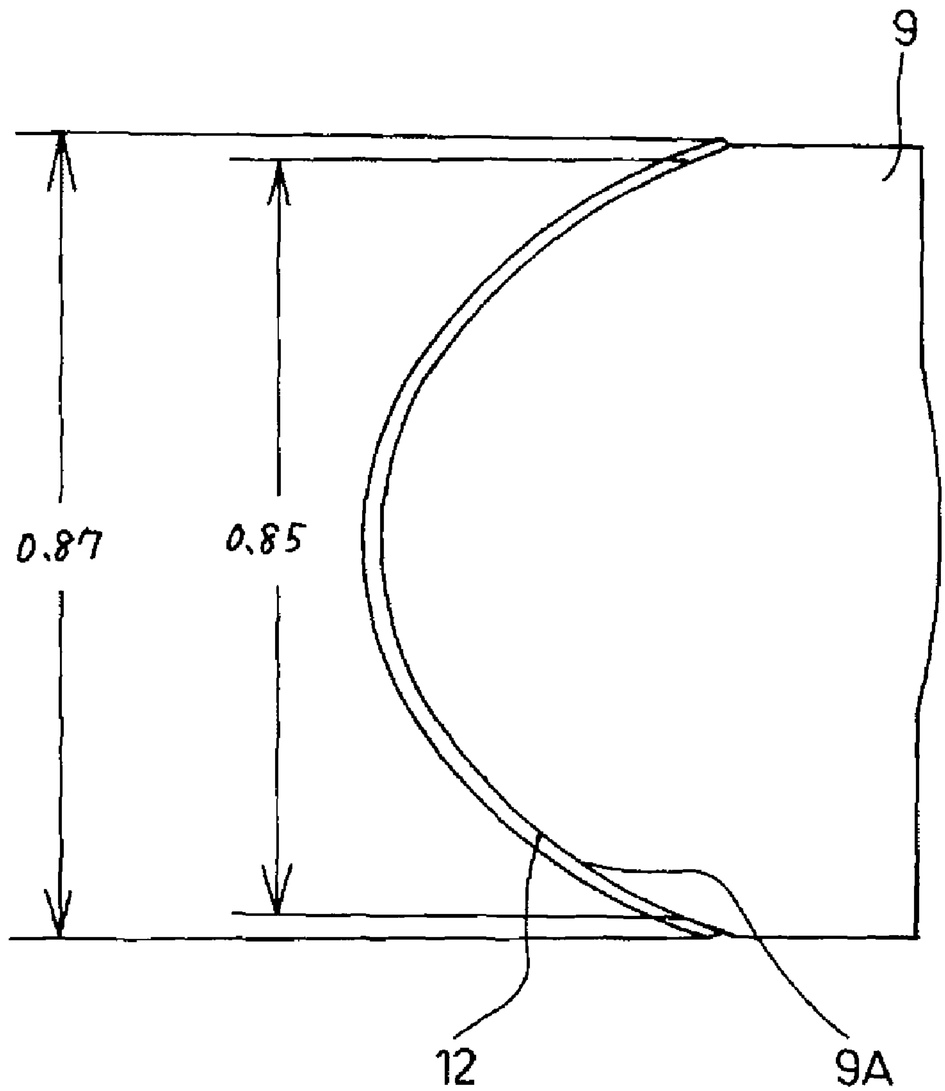
FIG. 2 is a side view of an objective lens used in the optical pickup apparatus of this embodiment.

FIG. 2 is a side view of the objective lens 9 of this embodiment, depicting the anti-reflection coating 12 formed on an incident surface 9A on which the laser beam emitted from the laser diode 1 is incident. As a technique of forming such an anti-reflection coating 12 on the incident surface 9A of the objective lens 9, the technique described in the above patent documents (Japanese Patent Application Laid-Open Publication Nos. 10-160906 and 2008-282507) may be used.

On the objective lens 9 incorporated in the optical pickup apparatus of this embodiment, a portion that acts to condense the laser beam on the signal recording layer L formed on the optical disc D extends up to a range of a numerical aperture 0.85. A range for the condensing action, that is, a lens surface functioning as a lens is, for example, formed to extend up to a range of a numerical aperture 0.87.

This numerical aperture 0.87 that is the range of formation of the lens surface is set based on the following point. That is, when an opening diameter tolerance of the mounting hole formed on the lens holder is ±0.05 mm and an outline tolerance of the objective lens 9 is 0/−0.03 mm, an integrated tolerance of the lens holder and the objective lens is derived by a known method of square sum root to be calculated at ±0.06 mm.

Therefore, when manufacturing the objective lens 9, it is necessary to design the objective lens 9 taking into consideration the calculated manufacturing tolerance 0.06 mm described above. When the focal distance of the actually used objective lens 9 is 1.408 mm, designing the objective lens 9 while taking into consideration the manufacturing tolerance 0.06 mm described above makes it necessary to design the objective lens 9 so that the range extending up to the numerical aperture 0.87 acts as the lens surface.

Hence, in the objective lens 9 that condenses the laser beam incident on the range extending up to the numerical aperture 0.85 and generates a laser spot, the objective lens 9 may be designed to cause the range extending up to the numerical aperture 0.87 to act as the lens surface.

The objective lens 9 is designed in such a manner, and the anti-reflection coating 12 formed on the incident surface 9A of the objective lens 9 is formed also in the range extending up to the numerical aperture 0.87. Such anti-reflection coating 12 will then be described referring to FIG. 3.

Figure 3:
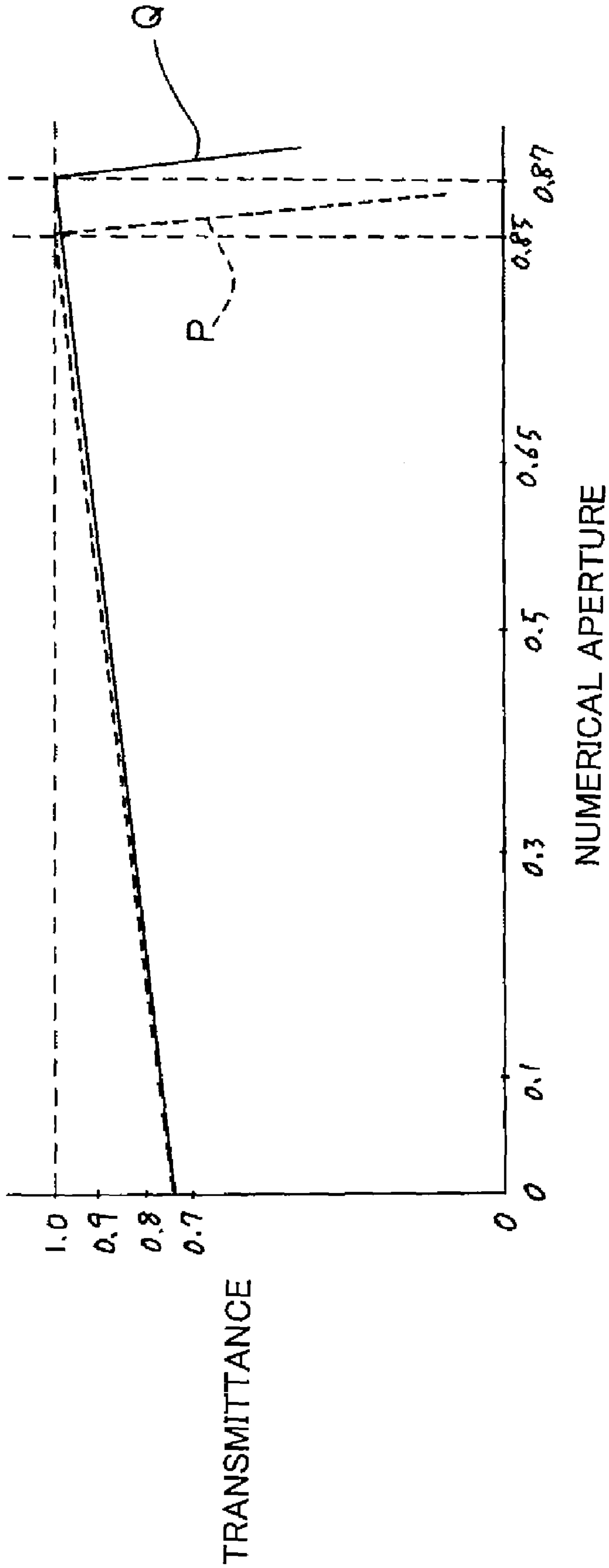
FIG. 3 is a characteristic diagram of the relation between a numerical aperture and a transmittance of the objective lens used in the optical pickup apparatus of this embodiment.

FIG. 3 depicts the relation between a numerical aperture and a transmittance in the case of forming the anti-reflection coating 12 on the incident surface 9A of the objective lens 9.

In FIG. 3, a broken line P represents the characteristics of the anti-reflection coating formed on a conventional objective lens. The broken line P demonstrates that the maximum of the transmittance is at the position at which the numerical aperture is 0.85, and that the transmittance drops sharply as the numerical aperture becomes larger than 0.85. Namely, this means that when the anti-reflection coating having such characteristics is formed on the objective lens, the transmittance at the position at which the numerical aperture is 0.85 may drop extremely due to the manufacturing tolerance. The occurrence of such a transmittance drop at the portion at which the numerical aperture is 0.85 causes the rim intensity of a laser spot to decrease, which poses a problem that the diameter of the laser spot cannot be reduced.

A solid line Q represents the characteristics of the anti-reflection coating 12 formed on the objective lens 9 of this embodiment. The solid line Q demonstrates that a maximum value of the transmittance is at the position at which the numerical aperture is 0.87, and that the transmittance drops sharply at a position at which the numerical aperture becomes larger than 0.87. This means that when the anti-reflection coating having such characteristics is formed on the objective lens 9, the transmittance at the position at which the numerical aperture is 0.87 may drop extremely because of the manufacturing tolerance but the transmittance at the portion at which the numerical aperture is 0.85 does not drop extremely.

In this manner, the objective lens 9 of this embodiment can surely increase the transmittance at the position at which the numerical aperture is 0.85 and which acts to generate a laser spot, thus the rim intensity of the laser spot can be enhanced. Therefore, the optical pickup apparatus of this embodiment is capable of enhancing the peak intensity of the laser spot generated by the condensing action by the objective lens 9 and of reducing the diameter of the laser spot, thus is capable of accurately carrying out the action of reading out a signal recorded on the optical disc D.

Note that, in this embodiment, when the numerical aperture of the objective lens is 0.85, the lens surface is formed to extend up to the portion having the numerical aperture of 0.87 and the transmittance is made the maximum at the position at which the numerical aperture is 0.87. The values of the numerical aperture, however, are not limited to this. That is, when the numerical aperture of the objective lens used for generating a laser spot is N1, the objective lens may be designed so that a lens surface acting as a lens up to a range of a numerical aperture N2 larger than the numerical aperture N1 is formed by taking into consideration the manufacturing tolerance, and that the transmittance of the anti-reflection coating becomes maximum at a position at which the numerical aperture is N2.

While description of this embodiment has been made of the case of forming the anti-reflection coating on the incident surface of the objective lens, the anti-reflection coating may naturally be formed on the surface opposite to the incident surface, that is, the surface closer to the optical disc.

This embodiment has been described of the case of applying the present invention to the optical pickup apparatus that carries out the action of reading out a signal recorded on the Blu-ray standard optical disc. The present invention, however, is applicable to an optical pickup apparatus conforming to a standard different from the Blu-ray standard.

The above embodiments of the present invention are simply for facilitating the understanding of the present invention and are not in any way to be construed as limiting the present invention. The present invention may variously be changed or altered without departing from its spirit and encompass equivalents thereof.

What is claimed is:

1. An optical pickup apparatus comprising:

a laser diode configured to emit a laser beam; and an objective lens configured to condense the laser beam into a laser spot through which a signal recorded on a signal recording layer of an optical disc is read out by the laser beam, the objective lens including a lens surface, a portion of the lens surface having a first numerical aperture used for forming the laser spot, the lens surface formed with a second numerical aperture for acting as a lens, the second numerical aperture larger than the first numerical aperture in consideration of manufacturing tolerance of the objective lens, and the lens surface having formed thereon an anti-reflection coating which determines a transmittance of the laser beam so that the transmittance of the laser beam becomes maximum at a position of the second numerical aperture, wherein the first numerical aperture used for forming the laser spot is 0.85, and the second numerical aperture is at least 0.87.

2. The optical pickup apparatus of claim 1, wherein the lens surface is an incident surface to which the laser beam enters.

3. The optical pickup apparatus of claim 1, wherein the antireflection coating is configured such that the transmittance of the laser beam increases from the first numerical aperture to the second numerical aperture so that the transmittance of the laser beam becomes maximum at a position of the second numerical aperture.

4. An optical pickup apparatus comprising:

a laser diode configured to emit a laser beam; and an objective lens configured to condense the laser beam into a laser spot through which a signal recorded on a signal recording layer of an optical disc is read out by the laser beam, the objective lens including a lens surface, a portion of the lens surface used for forming the laser spot, the lens surface formed with a full numerical aperture for acting as a lens, the full numerical aperture larger than a highest numerical aperture used for forming the laser spot in consideration of manufacturing tolerance of the objective lens, and the lens surface having formed thereon an anti-reflection coating which determines a transmittance of the laser beam so that the transmittance of the laser beam becomes maximum at a position of the full numerical aperture, wherein the highest numerical aperture used for forming the laser spot is 0.85, and the full numerical aperture is at least 0.87.

* * * * *

UNITED STATES PATENT AND TRADEMARK OFFICE

CERTIFICATE OF CORRECTION

PATENT NO. : 8,264,939 B2
APPLICATION NO. : 12/945636
DATED : September 11, 2012
INVENTOR(S) : Tohru Hotta et al.

It is certified that error appears in the above-identified patent and that said Letters Patent is hereby corrected as shown below:

Column 2, line 62: replace --away-- with “a way”.

Signed and Sealed this
Sixth Day of November, 2012

David J. Kappos
*Director of the United States Patent and Trademark Office*